United States Patent
Wilson

(10) Patent No.: US 12,294,662 B2
(45) Date of Patent: May 6, 2025

(54) SPATIAL BROADCASTING DEVICE AUTHENTICATION

(71) Applicant: ValiMail Inc., San Francisco, CA (US)

(72) Inventor: Ashley Duane Wilson, San Francisco, CA (US)

(73) Assignee: ValiMail Inc., Boulder, CO (US)

( * ) Notice: Subject to any disclaimer, the term of this patent is extended or adjusted under 35 U.S.C. 154(b) by 444 days.

(21) Appl. No.: 17/168,091

(22) Filed: Feb. 4, 2021

(65) Prior Publication Data

US 2021/0243038 A1    Aug. 5, 2021

Related U.S. Application Data

(60) Provisional application No. 62/969,672, filed on Feb. 4, 2020.

(51) Int. Cl.
*H04L 9/32* (2006.01)
*G01S 19/14* (2010.01)

(52) U.S. Cl.
CPC ............ *H04L 9/3263* (2013.01); *G01S 19/14* (2013.01); *H04L 9/321* (2013.01); *H04L 9/3247* (2013.01);
(Continued)

(58) Field of Classification Search
CPC ..... H04L 9/3263; H04L 9/321; H04L 9/3247; H04L 9/3297; H04L 2209/84; G01S 19/14
See application file for complete search history.

(56) References Cited

U.S. PATENT DOCUMENTS

| | | | |
|---|---|---|---|
| 7,123,974 B1 | 10/2006 | Hamilton | |
| 7,742,603 B2 | 6/2010 | Tengler et al. | |

(Continued)

FOREIGN PATENT DOCUMENTS

| | | | | |
|---|---|---|---|---|
| EP | 2083531 A2 | * | 7/2009 | ............ H04L 9/3263 |
| WO | WO 2014/131058 A2 | | 8/2014 | |

OTHER PUBLICATIONS

Parikh et al., "Privacy-preserving Services in VANET with Misbehavior Detection", IEEE Int Conference on Advance Networks and Telecommunication Systems (Year: 2017).*

(Continued)

*Primary Examiner* — John B King
*Assistant Examiner* — Alex D Carrasquillo
(74) *Attorney, Agent, or Firm* — Fenwick & West LLP

(57) ABSTRACT

Embodiments relate to systems for generating identity records (e.g., authentication certificates) at a server for validating broadcast messages. The server may receive a request to generate an identity record, where the request may include a public key of a named entity device that is configured to broadcast messages. The server may generate the identity record using the private key of the server and transmit the generated certificate to a namespace server for storage. A policy consuming device configured to receive a broadcast message, which may be signed using the private key of the named entity device, subsequently accesses the namespace server for the identity record including the public key of the named entity device. The policy consuming device validates the authentication certificate using the server's public key and validates the broadcast message using the named entity device's public key.

20 Claims, 5 Drawing Sheets

(52) U.S. Cl.
CPC ........ *H04L 9/3297* (2013.01); *H04L 2209/84* (2013.01)

(56) References Cited

U.S. PATENT DOCUMENTS

| | | | |
|---|---|---|---|
| 8,132,250 | B2 | 3/2012 | Judge et al. |
| 8,438,079 | B1 | 5/2013 | Nguyen et al. |
| 9,077,543 | B2* | 7/2015 | Luft ................. H04L 9/3297 |
| 9,419,951 | B1 | 8/2016 | Felsher et al. |
| 9,646,496 | B1* | 5/2017 | Miller ................ H04W 4/029 |
| 9,686,073 | B2 | 6/2017 | Goldstein |
| 9,762,556 | B2* | 9/2017 | James ............. H04L 63/0442 |
| 9,762,618 | B2 | 9/2017 | Goldstein |
| 9,800,402 | B2 | 10/2017 | Goldstein |
| 10,122,765 | B1 | 11/2018 | Goldstein |
| 10,169,342 | B1 | 1/2019 | Ben-Yair et al. |
| 10,229,157 | B2 | 3/2019 | Collins et al. |
| 10,237,278 | B1 | 3/2019 | Saylor et al. |
| 10,257,231 | B2 | 4/2019 | Goldstein |
| 10,469,330 | B1 | 11/2019 | Roth et al. |
| 10,642,969 | B2* | 5/2020 | James ................. G06F 21/45 |
| 10,798,216 | B2* | 10/2020 | Berdy .............. H04L 63/0876 |
| 10,897,485 | B2 | 1/2021 | Goldstein |
| 10,992,716 | B1 | 4/2021 | Cairney |
| 11,038,897 | B1 | 6/2021 | Wilson et al. |
| 11,323,422 | B2* | 5/2022 | James ............... H04L 63/061 |
| 2004/0177120 | A1 | 9/2004 | Kirsch |
| 2006/0277259 | A1 | 12/2006 | Murphy et al. |
| 2010/0082758 | A1 | 4/2010 | Golan |
| 2013/0318602 | A1 | 11/2013 | Devarapalli et al. |
| 2014/0047064 | A1 | 2/2014 | Maturana et al. |
| 2014/0164281 | A1 | 6/2014 | Balkir et al. |
| 2014/0244998 | A1* | 8/2014 | Amenedo ........... H04L 63/126 713/156 |
| 2015/0188949 | A1 | 7/2015 | Mahaffey et al. |
| 2016/0142387 | A1 | 5/2016 | Lockhart et al. |
| 2016/0162591 | A1 | 6/2016 | Dokania et al. |
| 2016/0171509 | A1 | 6/2016 | Fanous et al. |
| 2016/0205078 | A1 | 7/2016 | James et al. |
| 2016/0205097 | A1* | 7/2016 | Yacoub .............. H04L 61/4511 726/6 |
| 2016/0315969 | A1 | 10/2016 | Goldstein |
| 2016/0352705 | A1 | 12/2016 | Lockhart et al. |
| 2017/0012780 | A1 | 1/2017 | Kaliski, Jr. et al. |
| 2017/0083867 | A1 | 3/2017 | Saxena et al. |
| 2017/0270128 | A1 | 9/2017 | Smith et al. |
| 2017/0324724 | A1 | 11/2017 | Smith et al. |
| 2018/0034913 | A1* | 2/2018 | Matthieu ................ H04L 67/52 |
| 2018/0048460 | A1 | 2/2018 | Goldstein |
| 2018/0060601 | A1 | 3/2018 | Kay et al. |
| 2018/0172799 | A1 | 6/2018 | Meadow |
| 2018/0285977 | A1* | 10/2018 | Cleary ................ H04L 67/125 |
| 2018/0302446 | A1 | 10/2018 | Goldstein |
| 2019/0014180 | A1 | 1/2019 | Lawson et al. |
| 2019/0028832 | A1 | 1/2019 | Speede |
| 2019/0200228 | A1* | 6/2019 | Adrangi ................ H04L 9/3268 |
| 2020/0092257 | A1 | 3/2020 | Goldstein |
| 2020/0137081 | A1 | 4/2020 | Goldstein |
| 2021/0289001 | A1 | 9/2021 | Wilson et al. |

OTHER PUBLICATIONS

Alagar et al., Context-aware Trust-based Management of Vehicular Ad-hoc Networks (VANETs), IEEE Computer Society, pp. 255-261 (Year: 2015).*

Wang et al., "Privacy-Preserving Cloud-Based Road Condition Monitoring with Source Authentication in VANETs", IEEE Transactions on Information Forensics and Security, pp. 1779-1790 (Year: 2019).*

Rekik et al, "Improved Dual Authentication and Key Management Techniques in Vehicular Ad Hoc Networks", IEEE/ACS 14th International Conference on Computer Systems and Applications (Year: 2017).*

Rekik et al; Improved Dual Authentication and Key Management Techniques in Vehicular Ad Hoc Networks, IEEE/ACS 14th International Conference on Computer Systems and Applications, pp. 1133-1140, 2017 (Year: 2017).*

Lin et al; GSIS: A Secure and Privacy-Preserving Protocol for Vehicular Communications, IEEE Transactions On Vehicular Technology, vol. 56, No. 6, Nov. 2007 (Year: 2007).*

Rekik et al., "Improved Dual Authentication and Key Management Techniques in Vehicular Ad Hoc Networks", IEEE, ACS 14th International Conference on Computer Systems and Applications, 2017 (Year: 2017).*

Lin et al., "GSIS: A Secure and Privacy-Preserving Protocol for Vehicular Communications", IEEE, Transactions on Vehicular Technology, vol. 56, No. 6, 2007 (Year: 2007).*

Andersen, K. et al., "The Authenticated Received Chain (ARC) Protocol," Internet Engineering Task Force (IETF), Request for Comments: 8617, Jul. 2019, 35 pages, ISSN: 2070-1721.

Kucherawy, M. et al., "Domain-based Message Authentication, Reporting, and Conformance (DMARC)," Request for Comments: 7489, Mar. 2015, 73 pages, ISSN: 2070-1721.

PCT International Search Report and Written Opinion, PCT Application No. PCT/US2021/014481, May 3, 2021, 10 pages.

U.S. Appl. No. 17/128,008, filed Dec. 19, 2020, ValiMail Inc. (copy not enclosed).

U.S. Appl. No. 63/057,814, filed Jul. 28, 2020, ValiMail Inc. (copy not enclosed).

PCT International Search Report and Written Opinion, PCT Application No. PCT/US2021/016674, May 24, 2021, 10 pages.

PCT International Search Report and Written Opinion, PCT Application No. PCT/US2021/014483, May 3, 2021, 10 pages.

European Patent Office, Extended European Search Report and Written Opinion, European Patent Application No. 21750125.3, Jan. 2, 2024, 8 pages.

United States Office Action, U.S. Appl. No. 17/328,759, Dec. 29, 2023, 23 pages.

United States Office Action, U.S. Appl. No. 18/204,874, Mar. 28, 2024, 10 pages.

European Patent Office, Extended European Search Report and Written Opinion, European Patent Application No. 21744189.8, Feb. 15, 2024, 7 pages.

* cited by examiner

300

Receive identity publication request for a named entity device public key, the request including the named entity device public key that corresponds to a named entity device private key
310

↓

Generate an identity record, using a third-party server private key, that includes the named entity device public key
320

↓

Transmit, to a namespace server, the identity record, allowing a policy consuming device to validate, using the named entity device public key included within the identity record, a signed message broadcasted to the policy consuming device by the named entity device
330

FIG. 3

SPATIAL BROADCASTING DEVICE AUTHENTICATION

CROSS-REFERENCE TO RELATED APPLICATION

This application claims benefit to U.S. Provisional Patent Application No. 62/969,672, filed on Feb. 4, 2020, which is incorporated by reference herein for all purposes.

TECHNICAL FIELD

The present disclosure generally relates to device identity management and, more specifically, to authenticating messages broadcast from spatial devices.

BACKGROUND

Information contained in broadcasted messages loses value and even becomes harmful if it is obtained from untrustworthy sources. As autonomous and semi-autonomous devices become prevalent in daily activities, the legitimacy of messages broadcasted to control operations of these devices becomes increasingly critical. Spoofing and replaying messages are examples of how malicious actors may manipulate broadcast messages to send false information to devices. In another example, devices like roadside beacons that broadcast road condition messages may be stolen and re-deployed in different locations, causing traffic disruptions with misleading messages from the re-deployed beacons.

To detect manipulated or illegitimate messages, conventional systems perform checks such as comparing the time and location at which the message was broadcasted to the time and location at which the message was received at a device. For example, a roadside beacon may broadcast road hazard messages to autonomous vehicles, which determine that the messages are trustworthy if they are received within a certain threshold of time of being broadcasted or received within a certain radius of the roadside beacon. However, these conventional systems may incorrectly reject some legitimate messages that are intentionally broadcast to a long distance from their origin. Hence, conventional systems are unable to consistently and accurately determine the legitimacy of broadcast messages.

BRIEF DESCRIPTION OF THE DRAWINGS

FIG. 3 is a flowchart depicting an example process that illustrates a software algorithm for generating an authentication certificate for authenticating messages broadcast by a named entity device, in accordance with some embodiments.

Figure 1:
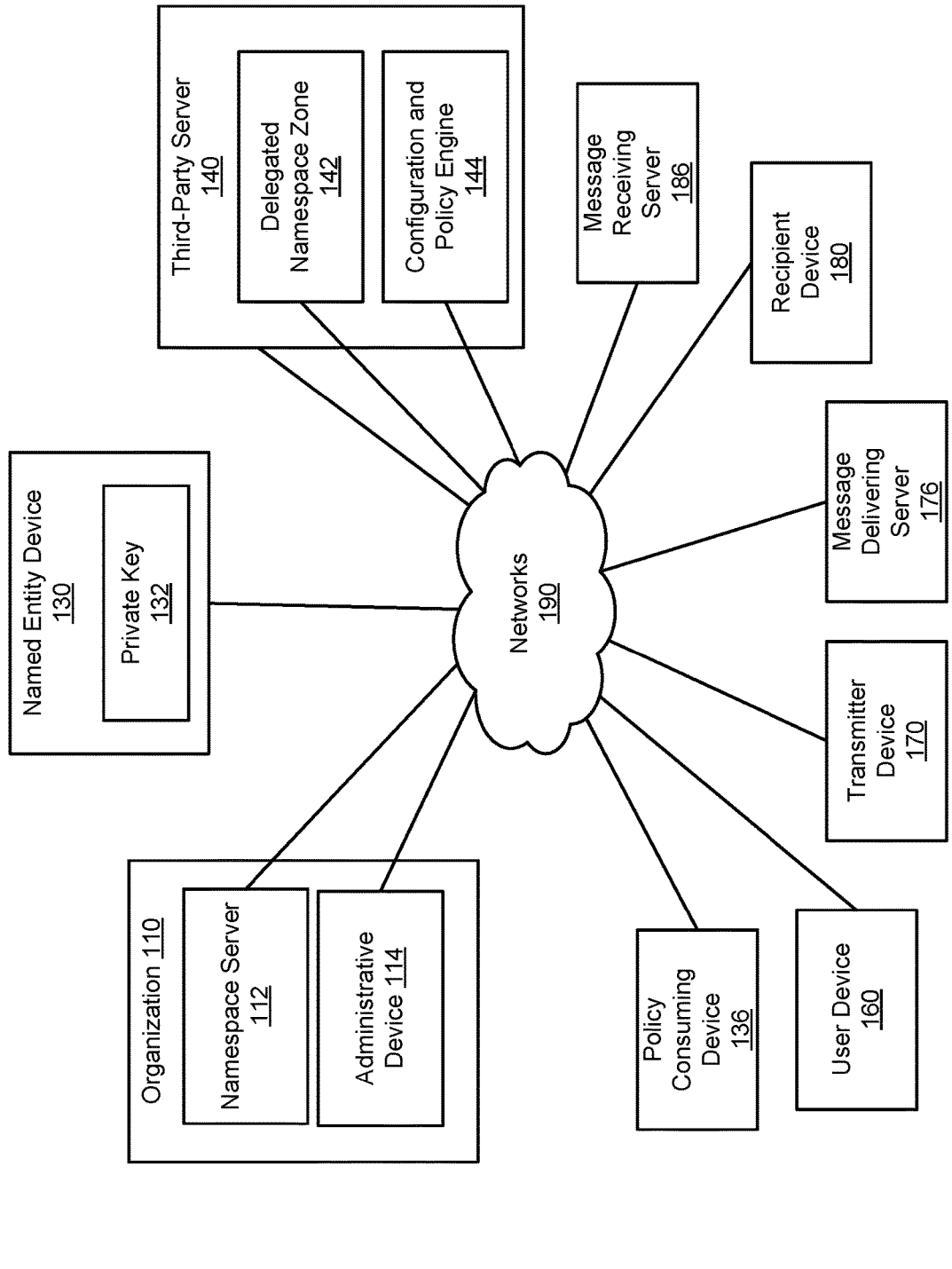
FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview:

Embodiments described herein are related to an authentication service that may be performed by a third-party server which is delegated to publish public keys on a namespace server (e.g., generate authentication certificates) on behalf of one or more different organizations. A device's public key may be used to validate the messages broadcasted by the device (e.g., public key authentication). In one example, an autonomous vehicle receives a hazard message from a roadside beacon and uses the beacon's public key accessed from a namespace server using domain name system security extensions (DNSSEC) to determine the legitimacy of the message and the beacon. The autonomous vehicle may alternatively use an authentication certificate that is generated by the authentication service, stored at the namespace server, and also includes the beacon's public key for authenticating the beacon and the beacon's messages. The hazard message may describe the roadside conditions within proximity to the vehicle (e.g., within a radius of five miles) or from a significant distance away from the vehicle (e.g., fifty miles). By using a device's public key in addition to or as an alternative to conventional checks such as time and location comparisons, message recipients like autonomous vehicles may improve the consistency and accuracy with which they determine the legitimacy of the broadcasted messages.

Furthermore, the authentication service described herein enables an organization to revoke trust from one of its broadcasting devices (e.g., a named entity device) that has been re-deployed or otherwise hijacked by a malicious actor. The third-party server may generate, for storage in a namespace server, identity records (e.g., a raw public key, authentication certificate, etc.) for trusted named entity devices. The third-party server may remove the identity records from storage to indicate to message recipients (e.g., policy consuming devices) that trust has not been established or has been revoked for a named entity device with no identity record in storage. This trust revocation process may not require extensive involvement from the organization, which may consume both time and processing resources, and may be predominantly performed by the third-party server. Thus, the authentication service offload processing that otherwise would be performed by the organization (e.g., an administrative device at the organization interacts with a certificate authority to revoke trust for a compromised named entity device). The third-party server maintains a record of named entity devices within a network and controls the generation of their identity records. In this way, the third-party server may centrally manage the communication topology for message authentication, controlling the means by which devices may be authenticated.

As yet a further advantage, the authentication service described herein may leverage a namespace server to enable a distributed configuration and optimize a policy consuming device's communication bandwidth. In particular, the policy consuming device may optimize its communication bandwidth by retrieving and authenticating an identity record in a communication band that is separate from the band over which the policy consuming device receives broadcasted messages. For example, an autonomous vehicle may use a cellular protocol (e.g., fourth generation long term evolution (4G LTE)) to receive and authenticate identity records and use a Wi-Fi protocol (e.g., IEEE 802.11p for wireless access in vehicle environments (WAVE)) to receive a roadside beacon's hazard messages.

Example System Environment:

Referring now to figure (FIG. 1, shown is a block diagram illustrating an example system environment 100 of a process delegation system in which an organization may delegate various tasks to a third-party server that is specialized in performing the tasks, in accordance with some embodiments. One of the tasks may be generating an identity record that allows for the authentication of a named entity device broadcasting messages. The system environment 100 may include an organization 110, a named entity device 130, a third-party server 140 that performs various delegated tasks, a policy consuming device 136, a user device 160, a transmitter device 170, a recipient device 180, and networks 190. In some embodiments, the system environment 100 may also include a message delivering server 176 and a message receiving server 186. In various embodiments, the system 100 may include different, additional or fewer components and entities. Also, in some implementations or situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a for-profit organization or a non-profit organization. An organization 110 may define an environment in which a group of units, individuals, and devices organize and perform activities and exchange information. The system environment 100 may include multiple organizations 110, which may be customers of the third-party server 140 that delegate certain tasks to the third-party server 140. For example, an organization 110 may delegate the generation of identity records for the named entity devices 130 to the third-party server 140.

An organization 110 has resources that are under its control. Example resources include a namespace server 112 and an administrative device 114. In some embodiments, some of the named entity devices 130 and some of the policy consuming devices 136 may also be part of the organization's resources. For example, some of the named entity devices 130 and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a policy consuming device 136 or both.

Figure 5:
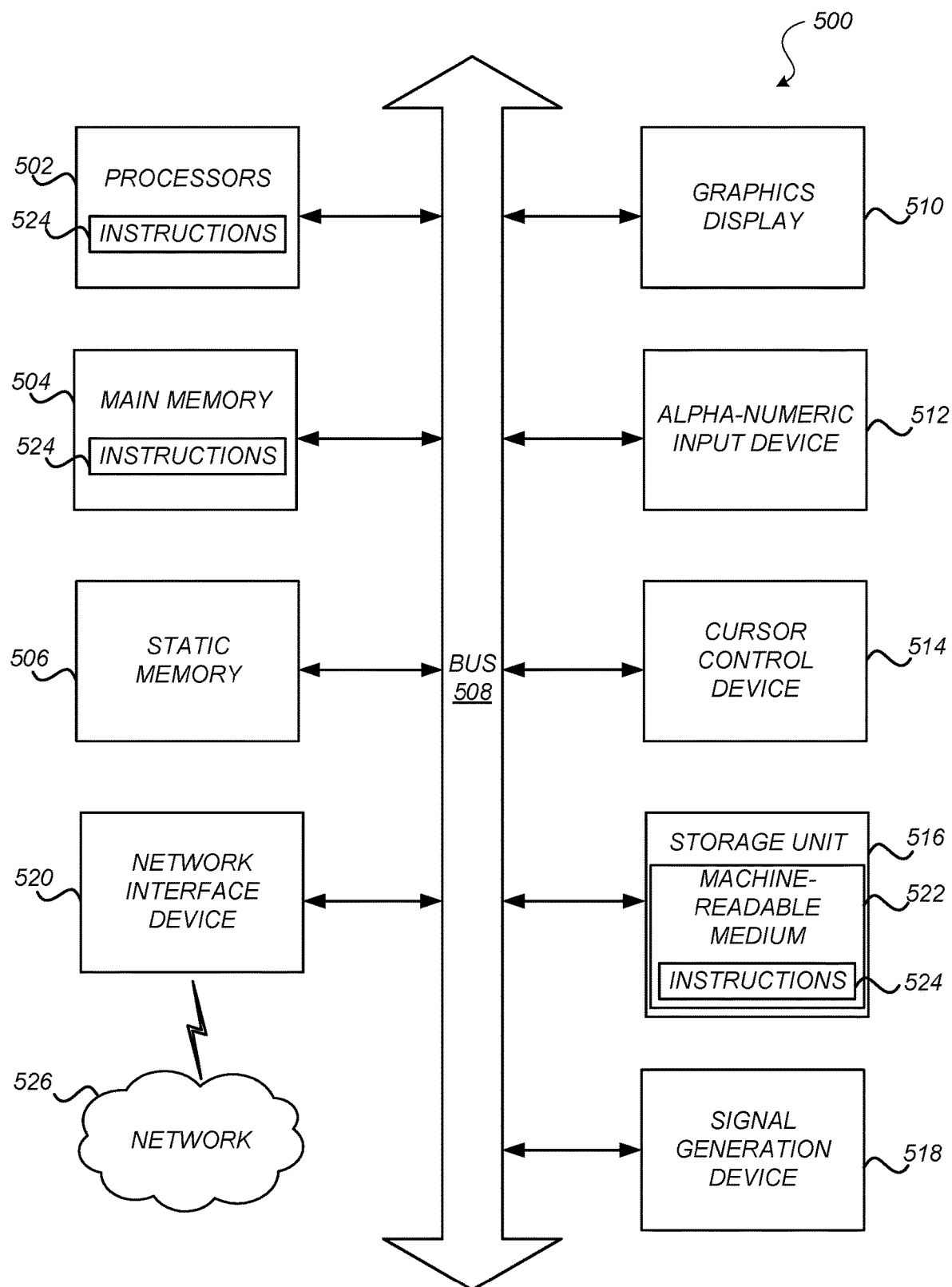
FIG. 5 is a block diagram illustrating components of an example computing machine, in accordance with some embodiments.

To manage its namespace, an organization 110 may include and control a namespace server 112. A namespace server 112 can be a domain owner DNS server. For example, an organization 110 may operate a BIND (Berkeley Internet Name Domain) server. Some or all of the components of a namespace server is illustrated in FIG. 5. The namespace server 112 for an organization 110 operates the namespace of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace server 112 associated with an organization 110 may store DNS records for use in a DNS system, manage namespace for the domain name associated with the organization 110, delegate one or more sub-domains to other servers that can be authoritative, and answer queries about the namespace of the domain. A namespace server 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a Top-Level Domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, an organization 110 may divide different branches of its namespace to different types of entities and devices. For example, natural persons may be under the namespace _persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or transport layer security authentication (TLSA) record type, RFC 6698). DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 5. An administrative device 114 may be operated by an administrator, whether it is a robotic agent or a natural person. An administrative device 114 may manage identity records of named entity devices 130 and policy consuming devices 136 that are associated with the organization 110. An administrative device 114 may also manage the configuration of various tasks that may be delegated to the third-party server 140, such as secure message distribution, encrypted device update distribution, namespace management, authentication services, policy management, and policy recommendations, which may be performed by various engines discussed in further detail in FIG. 2. For example, an administrative device 114 may provide configuration settings to the third-party server 140 to allow the third-party server 140 to manage configurations on behalf of the organization 110 and recommend new or modified configurations to address changes in the application environment. An administrative device 114 may also change the settings associated with various components and resources in the organization 110.

An organization 110 may create an application environment for various participants to perform activities and interact with each other. The application environment in this context may be distinguished from software applications (software programs) that may also be mentioned in this disclosure. An application in this context may be a system that involves multiple participants that may authenticate and trust one another. The participants may perform certain common operations together and interact with each other. Certain actions may be autonomous or may be decided by individual participants, while other actions may be defined by the policies set forth by the organization 110. An individual participant may communicate with the third-party server 140, which is delegated by the organization 110 to manage the policies of the organization 110. Participants of an application may include named entity devices 130 and policy consuming devices 136. Some of the devices may serve both roles. Examples of application environments may include a distributed application with clients and servers, sensors and actuators, or cameras and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies when interacting with the third-party server 140 and in controlling how the third-party server behaves when performing the delegated tasks.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, or any suitable objects or concepts that have names for identification. The named entity device 130 may be controlled manually by a person or autonomously by a machine. The named entity device 130 may receive instructions from an organization 110 (e.g., through the administrative device 114) to generate an identity publication request (e.g., a Certificate Signing Request). The named entity device 130 may include its public key and other identification information (e.g., a location and status as specified by the administrative device 114) within the identity publication request. The third-party server 140 may enable remote management of the identity record of the named entity device 130 (e.g., without requiring hands-on access or proximity of the administrative device 114) by publishing or removing published the identity record in the namespace server 112. In some embodiments, the publication and removal functionalities may be activated and deactivated through a software that delivers remote management functionality to the organization 110.

By way of example, a named entity device 130 may be a roadside beacon (which may be an IoT device) with an identity record in a DNS zone. The roadside beacon may broadcast signed messages that provide warnings to autonomous vehicles of dangerous road conditions. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and have one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 5. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM over Bluetooth, but not a complete TCP/IP stack). In some embodiments, some IoT devices may include a memory that can store a limited set of basic instructions, but may not have sufficient computing capability to dynamically determine context-specific policies for a given situation. Those devices may rely on the third-party server to perform computations dynamically for the devices.

In some embodiments, a named entity device 130 may include a private key 132 and a corresponding public key that are generated according to the PKI framework. The private-public key pair may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a trusted platform module (TPM). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server. The term "third party" may be viewed from the perspective of the organization 110, which may delegate certain tasks and services to another company, which has the expertise to perform the tasks and services. For example, the organization 110 may be a customer of the third-party server 140. The services provided by the third-party server 140 may include managing policies for an organization 110, recommending new policies to an organization 110, authenticating responses on behalf of organizations 110, policy distribution on behalf of organizations 110, secure software distribution to named entity devices 130, secure information distribution to policy consuming devices 136, and other tasks that may include authentication and authorization of various named entity devices 130 and policy consuming devices 136, such as IoT devices. In one embodiment, an organization 110 may integrate certain processes or services provided by the third-party server 140 via an Application Programming Interface (API), which allows the third-party server 140 to inspect some of the messages directed to or in transit in the organization 110 and enables the third-party server 140 to apply various policies after receiving the messages. Some examples of services that may be performed by the third-party server 140 are discussed in further detail below with reference to FIG. 2.

Some or all of the components and hardware architecture of a third-party server 140 are illustrated in FIG. 5. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace of an organization 110. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a configuration and policy engine 144. The configuration and policy engine 144 may determine rules for various participants in an application environment and may also work with an enrichment engine to generate one or more new policy recommendations for the organization 110. The policy recommendations may be generated in the course of managing the operation of an application environment that is governed by the policies of the organization 110. The third-party server 140 may identify new devices and entities and automatically determine the potential rules that should apply to those new devices. A policy may be defined and initiated by an organization 110. An organization 110 may transmit the policy setting to or configure the policy setting at the third-party server 140. The configuration and policy engine 144 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The configuration and policy engine 144 may determine dynamically one or more context-specific policies that are applicable to a policy consuming device 136. The configuration and policy engine 144 may transmit the determined policies to the policy consuming device 136 as an interaction control list. The distribution of the interaction control list may be through a direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

The third-party server 140 may generate identity records for use by a policy consuming device 136 to validate messages broadcasted and signed by a named entity device 130. Examples of identity records may include authentication certificates, raw public keys, any suitable technique for representing a public key in a namespace system, or a combination thereof. As referred to herein, an "authentication certificate" may be a digital certificate used within a certificate-based authentication infrastructure. In one example, the digital certificate may be a Public-Key Infrastructure X.509 (PKIX) certificate for the DANE protocol. Alternatively, the digital certificate may be any suitable or standardized method for representing identities in a namespace system. As referred to herein, a "raw public key" may be a public key that is provided as a standalone record (e.g., a TLSA record) of an encryption key without additional metadata. In one example of generating an identity record, the third-party server 140 generates a "public key publication." As referred to herein, a "public key publication" may be any suitable namespace record containing a public key. For example, public key publication may include a raw public key of a named entity device and optionally, an associated metadata record (e.g., TXT record) having metadata of the named entity device (e.g., coordinates indicating the location of the named entity device). In some embodiments, the third-party server 140 may generate a public key publication according to "Request for Comments: 7250" (RFC 7250) of the Internet Engineering Task Force (IETF).

In yet other embodiments, the third-party server 140 may generate a base64 encoded public key (e.g., Secure Shell (SSH) keys).

The third-party server 140 may receive an identity publication request (e.g., a Certificate Signing Request from the administrative device 114) that triggers the generation of the identity record. The identity publication request may be generated by the named entity device 130 and include the named entity device's public key, and optionally, a coordinate representing the physical location of the named entity device. The public and private keys of the named entity device may be referred to herein as the "named entity device public key" and "named entity device private key," respectively. The third-party server 140 may include the named entity device public key in the generated identity record. Additionally, the third-party server 140 may include other identification information within the identity record such as a location or a status of the named entity device 130. The third-party server 140 transmits the generated identity record to a namespace server (e.g., the namespace server 112) for storage and access by policy consuming devices 136.

A policy consuming device 136 may be a device associated with a policy consumer that consumes an interaction control list provided by the third-party server 140. In one example, the policy consuming device 136 is an autonomous or semi-autonomous vehicle. A policy consumer is an entity that consumes policy from the third-party server 140. A policy consuming device 136 may be a named entity device 130, but may also be a device that is anonymous. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself, but may also be a part of the policy consuming device 136 that is anonymous. For example, a browser plugin may be a policy consumer that receives interaction control lists but does not have an identity. The policy consuming device 136 may retrieve an identity record stored within the namespace server 112 to validate messages broadcast by the named entity device 130. For example, the policy consuming device 136 may use the named entity device public key included in an authentication certificate to validate a signature created by the named entity private key. In another example, the policy consuming device 136 may retrieve the raw public key of the named entity device from the identity record stored in the namespace server 112. The policy consuming device 136 determines, based on the results of the validation, whether to process the broadcasted message. As referred to herein, "processing a message" may include performing one or more operations based on the contents of the broadcasted message. The policy consuming device 136 may process a message based on a policy by the third-party server 140.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 5. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organizations 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as _devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 5. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), TLS, virtual private networks (VPNs), Internet Protocol security (IPsec), etc. The network 190 also includes links and packet switching networks such as the Internet. The network 190 may be any communication network that transmits data and signals by any suitable channel media such as wire, optics, waveguide, radio frequency, ID badge with a QR (quick response) code, infrared, or any suitable electromagnetic media. The network 190 may also be a direct communication between two devices. The network 190 can be in any topology, such as point-to-point, star, mesh, chain, bus, ring, and any other suitable, regular or irregular, symmetric or not, cyclic or acyclic, fixed or dynamic (e.g., certain devices moving) topology.

The networks 190 may include one or more communication links suitable for indoor position tracking, hybrid outdoor localization, or any suitable wireless high-precision localization application (e.g., for IoT devices). Example communication techniques suitable for high-precision localization applications may include Ultra Wideband (UWB), 5G New Radio (5G NR), massive Multiple-Input Multiple-Output (MIMO), Millimeter-wave (mmWave), enhanced mobile broadband (eMBB), Ultra Reliable Low Latency Communications (URLLC), massive machine-type-communications (mMTC), or a combination thereof. In some embodiments, hybrid communication techniques based on a combination of positioning methods may be implemented. For example, the networks 190 may use a combination of the aforementioned techniques and additional techniques such as MIMO, Wi-Fi, GPS, Zigbee, Bluetooth, Bluetooth Low Energy. The networks 190 may include communication links between unlicensed user devices and licensed communication channels that avoids interference with licensed user devices on the corresponding, licensed communication channels. For example, the network 190 may include communication links using technologies such as cognitive radio, LTE-Unlicensed (LTE-U), licensed-assisted access (LAA), MulteFire, and 5G New Radio Unlicensed (5G NR-U).

Example Third-Party Server

Figure 2:
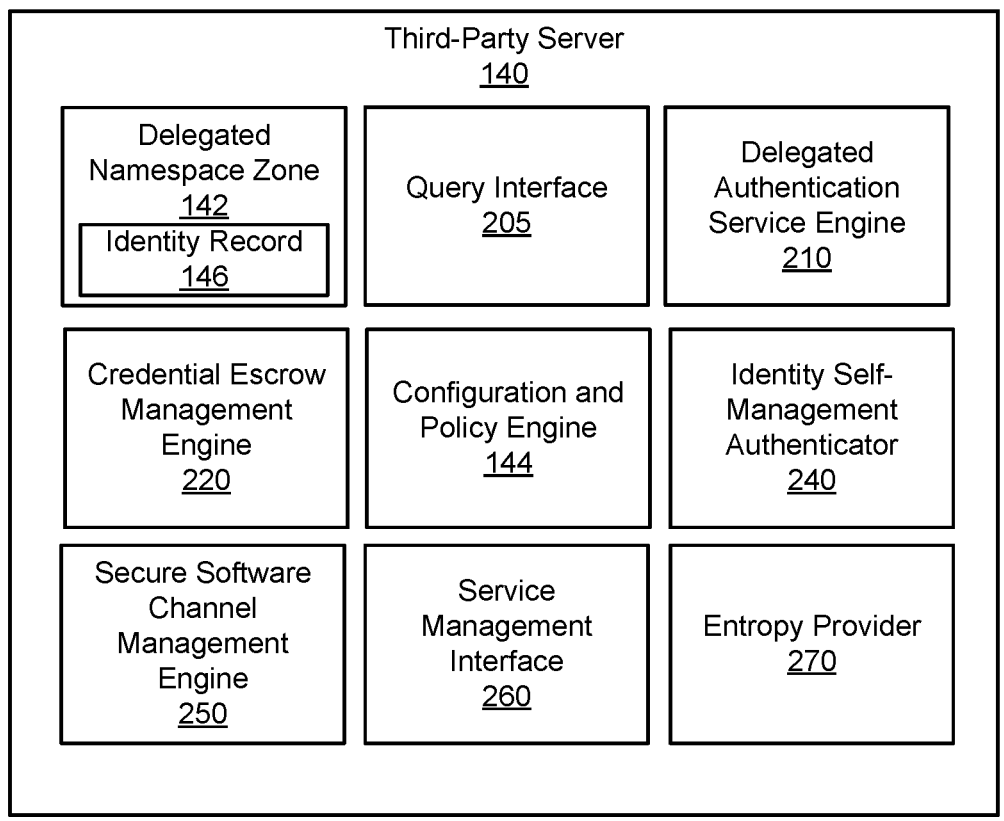
FIG. 2 is a block diagram illustrating various components of an example third-party server, in accordance with some embodiments.

FIG. 2 is a block diagram illustrating an example third-party server 140, in accordance with some embodiments. In some embodiments, the third-party server 140 may include a delegated namespace zone 142, a query interface 205, a delegated authentication service engine 210, a credential escrow management engine 220, a configuration and policy engine 144, an identity self-management authenticator 240, a secure software channel management engine 250, a service management interface 260, and an entropy provider 270. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 5.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, a publicly accessible server, another suitable server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 6698), and DKIM (RFC 8376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 corresponding to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formats (e.g., tabular, CSV, tab delimiter, XML, JSON) to store the identity records 146 are also possible.

The query interface 205 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 205. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 205. The device uses its private key to decrypt the symmetric key. The symmetric key is then used to decrypt the encrypted data payload.

The query interface 205 may serve to anonymize the identities of organizations 110 and devices. For example, the third-party server 140 may serve as a centralized server for the distribution of various messages on behalf of different organization customers. The query interface 205 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 205 will not reveal the identity of the organization 110 because the organization has delegated the message response task to the third-party server. In some embodiments, the third-party server 140 may provide a specific address of the query interface 205 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 205 may take various forms. For example, in some embodiments, the query interface 205 takes the form of an API such as REST (representational state transfer), SOAP (Simple Object Access Protocol), RPC (remote procedural call), or another suitable type. In some embodiments, the query interface 205 may be a namespace server such as a DNS server. In some embodiments, the query interface 205 may be a network routing node or a packet switching node. Other types of network interface may also be used as the query interface 205.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include metadata that allows the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications arises from the contexts constraining the communications. Besides verifying the credential, a message recipient may also verify other contexts. Examples of such contexts may include time (now, not later), location (here, not there), directionality (one way or two way), means (e.g. mobile phone not email), sequencing (in a chain of communications, whether order matters or not), topology (one-to-one, one-to-many, many-to-one), modifiability (whether the communications can be modified), modifications (whether modifications are allowed), and form of ID (the primary authenticated key into the database, for DNS this is a domain, for other datastores such as IPFS and blockchain, the keys are different). Non-substantive constraining context or limitations to the communications may be managed by the third-party server 140. Further examples of contexts include amplification, aggregation, summarization, shelf life, and revocation. Another example is a computationally intensive context-one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC and TLS to ensure the response is securely delivered to the IoT device.

The configuration and policy engine 144 may determine rules for various participants in an application environment. A policy may be defined and initiated by an organization 110. An organization 110 may transmit the policy setting to, or build the policy at, the third-party server 140. The configuration and policy engine 144 translates the policy to one or more configurations, whether generated automatically based on the policy requirement or generated partially manually through a guided workflow.

The configuration and policy engine 144 may determine dynamically one or more context-specific policies that are applicable to a policy consuming device 136. The configuration and policy engine 144 may transmit the determined policies to the policy consuming device 136 as an interaction control list. Interaction control lists may be a set of rules that define what devices are authorized to interact with a policy consuming device 136 and define how the policy consuming device 136 may behave in certain situations. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role allows for the grouping of assets that perform the same functions within an application environment, providing a logical container for the assets. A member is a participant in an application environment. A member may be a named entity device 130 or a policy consuming device 136. Continuing with the example of a role being a type of sensor, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata.

A rule may be a feature of a particular role, but may also be a feature of the broader application. The details of the policy may be translated into various configurations in order for the policy to be achieved.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The configuration and policy engine 144 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret credentials (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted with the device's public key, which may be included in a DNS record. For the DNS record of a named entity device 130, the public key or certificate may be removed after a predetermined period to allow an ephemeral PKI-based identity. The identity self-management authenticator 240 may authenticate the ephemeral identity. For instance, if a device has a core identity with name 123.edge._device.example.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at serviceclient.123.edge._device.example.com by virtue of the application being configured to allow devices to establish short-lived sub-identities in this fashion. The process of establishing this name-pubkey identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device.example.com as the parent or core identity. The second record at 123.summarizer._device.anotherexample.com may be a TLSA record which contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._anotherexample.com name, (3) use the private key associated with the 123.edge._device.example.com identity to generate a cryptographic signature of the CSR and a nonce, and (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device.anotherexample.com is 123.edge._device.example.com, (3) retrieve the public key associated with the 123.edge._device.example.com identity and use that public key to authenticate the CSR, nonce, and signature, and (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 205. In response, the secure software channel management engine 250 may generate the appropriate data payload as a response to the query. The response may be encrypted as discussed above with reference to the query interface 205.

The secure software channel management engine 250 may maintain a database which correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS or MQTT) the secure software channel management engine 250 may correlate the device's identity with the appropriate software channel and indicate to the client device the unique identifier of the current version of the software. The unique identifier may be a version tag (v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as data payload. The third-party server 140 may encrypt the asset with the public key associated with the requesting device's identity. This may be a direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same certificate and signature provided via the initial update request interaction to verify the software download.

The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. An example of an artifact management engine may include services provided by companies such as ARTIFACTORY.

The service management interface 260 may be an interface for an organization administrator to change settings with respect to various engines such as to change message distribution policies associated with the query interface 205, change the authentication policy in the engine 210, to upload credential to the credential escrow management engine 220, define various policies for distribution by the configuration and policy engine 144, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or be in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination thereof that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that are expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device with the keys. The entropy provider 270 may also be used to generate random symmetric keys that are used to encrypt messages and other data payloads transmitted from the query interface 205, whether the data payloads are device updates generated by secure software channel management engine 250 or other types of message payloads.

Example Authentication Processes

FIG. 3 is a flowchart depicting an example process 300 that illustrates a software algorithm for generating an identity record for authenticating messages broadcast by a named entity device, in accordance with some embodiments. The software algorithm may be stored as computer instructions that are executable by one or more general processors (e.g., CPUs, GPUs). The instructions, when executed by the processors, cause the processors to perform various steps described in the process 300. In various embodiments, one or more steps in the process 300 may be skipped or be changed. The process 300 may be performed by the third-party server 140 or a server of an organization 110. While the process 300 and other processes discussed in this disclosure may be described as being performed by the third-party server 140, these processes may also be performed by other suitable computers. For example, an organization 110 may not delegate the distribution of messages to the third-party server 140. Instead, the organization 110 may have a computing server that directly performs the process 300.

A server, such as the third-party server 140, may receive 301 an identity publication request (e.g., a Certificate Signing Request (CSR)) for generating an identity record. The identity publication request may include a public key of a named entity device (e.g., the named entity device 130), which possesses a private key corresponding to the public key. The named entity device 130 may include additional information within the identity publication request such as a location record and a status record. The location record may include a street address, city, county, state, any suitable description of the location of the named entity device 130, or a combination thereof. The status record may indicate whether the named entity device 130 is in service. The status record may be associated with a domain name under which the record is published (e.g., 123.beacon.example.gov). This status record may allow the organization 110 to indicate to a policy consuming device 136 whether the trust has been revoked from the named entity device 130. For example, the organization 110 can request an identity record be published in the namespace server 112 indicating that the status is deactivated because a malicious attacker has hijacked the named entity device 130 and is replaying broadcasted messages that may misinform policy consuming devices 136. The named entity device 130 may generate the identity publication request based on instructions from a device that manages the named entity devices of an organization, such as the administrative device 114, which receives the generated CSR request and submits it to the third-party server 140.

The third-party server 140 generates 320 the identity record after receiving the identity publication request. The third-party server 140 includes the named entity device public key within the generated identity record and signs the certificate using the third-party server's private key (i.e., the third-party server private key). The third-party server 140 may additionally include contextual information such as the location and status records of the named entity device 130 within the identity record. The identity record may be an authentication certificate (e.g., PKIX certificate). In some embodiments, the third-party server 140 generates 320 a public key publication that includes a raw public key (e.g., as described in IETF RFC 7250) of the named entity device. The third-party server 140 may optionally include a TXT record of metadata such as the location, status, or identification information of the named entity device 130 with the named entity device public key when generating 320 the public key publication.

The third-party server 140 transmits 330 the identity record to a namespace server (e.g., the namespace server 112) for storage and subsequent access by policy consuming devices (e.g., the policy consuming device 136). The identity record enables the policy consuming device 136 to validate, using the named entity device public key included within the identity record, a message that is signed and broadcasted by the named entity device 130. The third-party server 140 may transmit 330 the named entity device public key and other metadata of the named entity device 130. In one example, the identity record may be the raw public key of the named entity device 130 (e.g., a TLSA record) and a TXT record including the metadata. The policy consuming device 136 may access a TLSA record of the named entity device public key and a TXT record from the namespace server 112 using DNSSEC. Although TXT and TLSA record formats are referred to herein, any record format suitable for representing certificates, public keys, or associated metadata of a named entity device may be used. For example, the third-party server 140 may use record formats such as CERT or OPENPGPKEY. The records may be provided by the namespace server 112 individually, where each record is delivered with cryptographic assurances of authenticity and integrity through the DNSSEC trust chain that originates from the root zone public key of the namespace server 112. Alternatively, the policy consuming device 136 may access the identity record using PKI, whereby the metadata and named entity device public key are included within an authentication certificate.

Various methods of accessing the named entity device public key may correspond to various cryptographic roots of trust. By accessing the named entity device public key through an authentication certification, the policy consuming device 136 uses a PKI-based cryptographic root of trust to ascertain the trustworthiness of the named entity device public key and other metadata (e.g., location of the named entity device 130). By accessing the named entity device public key through DNSSEC, the policy consuming device 136 uses the trust chain of DNSSEC.

In some embodiments, the identity record stored at the namespace server 112 is generating using a third-party server private key (e.g., signed with the private key) for additional security. The policy consuming device 136 may use a third-party server public key to validate the identity record. For example, the signature created using the third-party server private key may be validated by the third-party server public key to determine that the contents of the signed identity record (e.g., the named entity device public key) are trustworthy. In some embodiments, the third-party server 140 may use the public key of the policy consuming device 136 to encrypt the identity record. The policy consuming device 136 may decrypt the received identity record using the policy consuming device's private key. The policy consuming device 136 may subsequently validate the message signature using the trusted named entity device public key and if the signature validation is successful, process the message.

The third-party server 140 may further enable the organization 110 to remotely manage the identity records of named entity device 130 by transmitting 330 the identity records conditionally. In some embodiments, the third-party server 140 may retain the identity records in a local storage and transmit 330 a publication at times when a corresponding named entity device 130 is expected or authorized to be active (e.g., as specified by an administrative device 114). This way, the identity record may not need to be reissued periodically for a named entity device 130 having a fixed location but seldom active. For example, a named entity device 130 may be a roadside beacon located at a bridge at risk for having accumulated ice as a result of weather conditions. The administrative device 114 or an automation system (e.g., as managed by the organization 110) may activate the beacon's identity when the conditions are expected to be hazardous by transmitting a request to the third-party server 140 to publish the identity record. The beacon, if internet-enabled (e.g., connected to the networks 190), may detect the activation of its own identity through the namespace server 112 and begin broadcasting warning messages to vehicles crossing the bridge. The third-party server 140 may maintain the same identity record for stationary named entity devices 130, such as the roadside beacon located at the bridge. However, the third-party server 140 may remove the identity record from the namespace server 112 (e.g., by instructing the namespace server 112 to delete the record) or transmit unusable data (e.g., data in a format that a policy consuming device 136 cannot process) in the namespace server 112 to indicate that the named entity device 130 is not authorized or otherwise untrusted. In some embodiments, the third-party server 140 may reissue identity records for the named entity devices 130 whose deployment locations change over time (i.e., reissuing a publication with each relocation).

Figure 4:
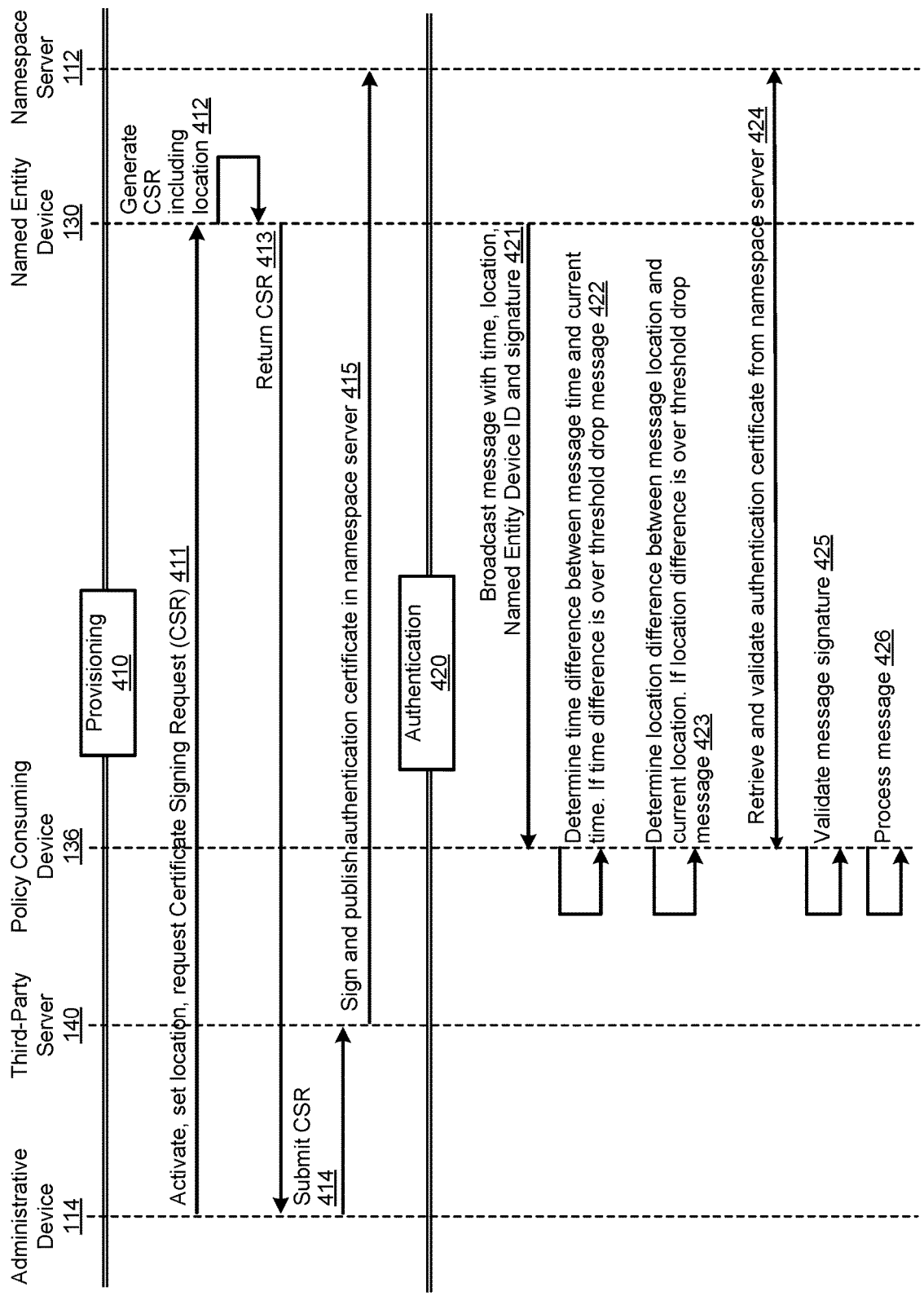
FIG. 4 is a flowchart depicting an example process that illustrates a software algorithm for provisioning a named entity device and authenticating messages broadcast by the named entity device, in accordance with some embodiments.

FIG. 4 is a flowchart depicting an example process 400 that illustrates a software algorithm for provisioning a named entity device and authenticating messages broadcast by the named entity device, in accordance with some embodiments. While the process 400 references an authentication certificate, the process 400 may also be applied to generating additional forms of a identity record (e.g., a publication including a raw public key and a TXT record of a named entity device's metadata). The software algorithm may be stored as computer instructions that are executable by one or more general processors (e.g., CPUs, GPUs). The instructions, when executed by the processors, cause the processors in different devices to perform various steps described in the process 400. The process 400 may be performed by an administrative device 114, a third-party server 140, a policy consuming device 136, a named entity device 130, and a namespace server 112. The process 400 may be an example of the process 300.

The process 400 includes two phases: a phase 410 to provision a named entity device 130 and a phase 420 to authenticate the named entity device 130. The process 400 may be used to configure the named entity device 130 to broadcast messages from its location to policy consuming devices 136. In particular, an authentication certificate can be generated for the named entity device 130 for use by the policy consuming device 136 in authenticating the identity of the broadcasted message's sender. In various embodiments, one or more steps in the process 400 may be skipped or be changed. For example, retrieving and validating 424 the authentication certificate may be performed as an alternative to or before one or more of determining 422 a time difference of determining 423 a location difference.

During the provisioning phase 410, the administrative device 114 activates the named entity device 130, sets a location of the named entity device 130, and requests 411 a CSR from the named entity device 130. The administrative device 114 and the named entity device 130 may both be managed by the organization 110. The administrative device 114 may activate, deactivate, or reactivate the named entity device 130. In some embodiments, a status record included within the CSR request and subsequently, within the authentication certificate represents the activation of the named entity device 130 by the administrative device 114 (e.g., the status record indicates a roadside beacon is in-service).

The administrative device 114 may modify the location of the named entity device 130. For example, the named entity device 130 is a roadside beacon that the organization 110 places at a highway entrance and activates for initial use in broadcasting traffic messages to policy consuming devices 136 (e.g., autonomous vehicles) within its proximity. In another example, an administrator places a roadside beacon at or near the site of temporarily degraded road conditions and may deactivate the beacon once the road conditions return to normal and the beacon is removed. The administrator may power on the named entity device 130 and verify that the time as indicated by the named entity device 130 is accurate and/or that the contents of broadcasted messages are correct. The named entity device 130 may have a built-in interface to allow the administrator to perform these operations or it may be communicatively coupled to a secondary device (e.g., a mobile phone) configured to adjust operating parameters of the named entity device 130. In some embodiments, the administrative device 114 may deactivate the beacon after determining that the beacon has been compromised and reactivate the beacon after reconfiguring the beacon's identity for secure use.

The administrative device requests 411 a CSR, which instructs the named entity device 130 to generate 412 the CSR. The named entity device may generate 412 a CSR that includes the location and public key of the named entity device 130. In some embodiments, the CSR request may include additional information such as the name of an organization (e.g., the organization 110), a DNS identifier, or any suitable identification information. The CSR request may include a status record of the named entity device 130.

The named entity device 130 returns 413 the CSR to the administrative device 114, which submits 414 the CSR to the third-party server 140. The third-party server 140 may receive the CSR at a query interface 205. The third party server 140 triggers a certificate publication workflow, which includes generating an authentication certificate and publishing the generated certificate to the namespace server 112. For example, the query interface 205 transmits the information within the CSR to credential escrow management engine 220, which generates an authentication certificate that includes the public key. In some embodiments, the third-party server 140 may generate an authentication certificate that includes the location and status of the named entity device 130.

The third-party server 140 signs 415 the generated authentication certificate with its private key (i.e., the third party server private key) and transmits the authentication certificate to the namespace server 112. By signing 415 the authentication certificate, the third-party server 140 may indicate to recipients of the authentication certificate (e.g., policy consuming devices 136) that its contents are trusted (e.g., the public key and location of the named entity device 130). When the authentication certificate is published in the namespace server 112, it is made available to policy consuming devices 136 that request the certificate to authenticate the identity of the named entity device 130 whose broadcasted messages the policy consuming devices 136 are receiving.

During the authentication phase 420, a policy consuming device 136 authenticates the identity of the named entity device 130 and determines whether messages broadcasted by the named entity device 130 should be processed depending on the outcome of the authentication. In particular, the policy consuming device 136 uses the authentication certificate generated during the provisioning phase 410 to authenticate the digital signature of the messages broadcasted by the named entity device 130.

The named entity device 130 broadcasts 421 a message to the policy consuming device 136, where the message includes a timestamp, a location, an identifier, and a signature. The timestamp may be the time at which the message is generated (i.e., a "generated timestamp") or the time at which the message is broadcasted by the named entity device 130. The location may be the location at which the named entity device 130 is located (e.g., as specified by the administrative device 114 during the provisioning phase 410). The location included within the message may be expressed using, for example, Global Positioning System (GPS) coordinates. The identifier may be a named entity device ID (e.g., a DNS identifier). The signature is created using the named entity device private key. The policy consuming device 136 may use the named entity device ID to determine whether the named entity device ID is within a permitted domain. In some cases, the policy consuming device 136 may also send a separate query to the third-party server 140 to determine whether the policy consuming device 136 has the authorization to interact with the named entity device 130. In turn, the third-party server's configuration and policy engine 144 may generate an interaction control list based on the ID and provide the list to the policy consuming device 136. If the ID is not within a permitted domain, the policy consuming device 136 may drop the message. As referred to herein, a device "drops a message" by not processing the message, discarding the message, flags the message as invalid, or another suitable action that does not result in the contents of the message being processed by the device. The policy consuming device 136 may perform other authentication operations such as comparing timestamps and locations to respective thresholds, which may be specified by the administrative device 114, to determine whether to drop the message.

The policy consuming device 136 determines 422 a time difference between the timestamp of the message and the current time or time at which the policy consuming device 136 received the message (i.e., a "received timestamp"). For example, the policy consuming device 136 is a part of an autonomous vehicle and uses the vehicle's clock to determine the current time for comparison with the message timestamp. If the time difference is over a threshold time difference, the policy consuming device 136 drops the message. In one example, the threshold time difference is a predetermined timeout threshold (e.g., 30 seconds) set by the operator of the policy consuming device. The policy consuming device 136 determines, based on timestamp of the message, that the message was generated two minutes prior to the current time and thus, drops the message because the two-minute time difference exceeds the predetermined timeout threshold. If the time difference does not exceed the threshold, the policy consuming device 136 may proceed to additional message validation checks (e.g., determining 423 a location difference and/or retrieving 424 the authentication certificate to validate 425 the signature in the message).

The policy consuming device 136 determines 423 a location difference between the location as indicated by the message (e.g., the location of the named entity device 130) and the current location of the policy consuming device 136. For example, the policy consuming device 136 is a part of an autonomous vehicle and uses a GPS device onboard the vehicle to determine its current location. The location difference may be a measure of distance (e.g., miles, meters, etc.). If the location difference is over a threshold distance difference, the policy consuming device 136 drops the message. For example, the policy consuming device 136 determines, based on GPS coordinates of the location within the message and the autonomous vehicle's, that the message was generated from a mile away. Given an example distance difference threshold of one hundred meters, the policy consuming device 136 drops the message because the message was generated at a distance difference greater than the threshold allows. Additionally or alternatively, the policy consuming device 136 may determine a location difference between the location of the named entity device 130 indicated by the message and an expected location of the named entity device 130 indicated by the authentication certificate retrieved 424 from the namespace server 112. The policy consuming device 136 may determine to drop the message if the location difference is greater than a threshold distance difference (e.g., one meter).

The policy consuming device 136 retrieves 424 and validates the authentication certificate from the namespace server 112. The policy consuming device 136, after receiving the message from the named entity device 130, may use the identifier of the named entity device 130 included in the message to retrieve the identity record (e.g., the named entity device public key and metadata) from the namespace server 112. In some embodiments, the policy consuming device 136 may perform a DNS lookup to retrieve the TXT records of the named entity device 130. The TXT records may contain a location record and a status record of the named entity device 130. The policy consuming device 136 may use the status record to determine whether to proceed with validating 425 the message signature. For example, the status record may indicate that the named entity device 130 has been deactivated, and based on this status record, the policy consuming device 136 may determine to drop the message (e.g., to avoid processing 426 a message from a compromised device). To authenticate the source of the authentication certificate, the policy consuming device 136 may use a public key of the third-party server 140 to validate the signature of the authentication certificate made using the private key of the third-party server 140. For example, the policy consuming device 136 may retrieve the public key of the third-party server 140 from the DNS address of the third-party server 140. In some embodiments, the policy consuming device 136 may validate signatures on broadcast messages while offline (e.g., without a connection to the namespace server 112 through the networks 190) with local copies of authentication certificates for respective named entity devices 130.

After validating the authentication certificate received from the namespace server 112, the policy consuming device 136 may use the public key of the named entity device 130 included within the authentication certificate to validate 425 the message signature. If the public key included within the validated authentication certificate is unable to validate the signature of the broadcasted 421 message, the policy consuming device 136 will not proceed to process 426 the message. Otherwise, the policy consuming device 136 processes 426 the message. The policy consuming device 136 may process 426 the message by performing, based on a policy (e.g., determined by the configuration and policy engine 144), one or more operations based on the contents of the broadcasted message. For example, a policy may outline rules for what roadside beacons can change to an autonomous vehicle's automated routine (e.g., navigation routines) depending on the location of the beacons. The policy consuming device 136 may change certain aspects of its navigation routine based on the message contents (e.g., a road hazard warning) and a policy's rules.

In some embodiments, if the message sender is unsuccessfully authenticated during the authentication phase 420, the policy consuming device 136 may send an error message to an address or other contact method (e.g., API location, domain name, URL, IP address, etc.) indicated in a technical contact record stored within the namespace server 112. The address may be associated with the administrative device 114 involved in the provisioning phase 410 of the named entity device 130 or it may belong to any suitable device or entity (like a security event management system) responsible for a sub-domain of the named entity devices 130. The technical contact record may be a TXT record. In some embodiments, if there is no address within the technical contact record, the policy consuming device 136 may perform a DNS lookup until it determines an organizational domain to which the named entity device 130 belongs to. If no contact information exists for the organizational domain exists, the error message may be dropped and no further processing may be performed with respect to the received broadcast message. In some embodiments, the policy consuming device 136 may send the error message (e.g., via an anonymization service) and include GPS coordinates where the error was detected.

The administrative device 114 may receive and process the error message from the policy consuming device 136. Responsive to the error message indicating a bad timestamp, the administrative device 114 may determine that a replay attack is in process or that the named entity device 130 is misconfigured. If the error message indicates that the named entity device 130 is not in service, the administrative device 114 may determine that the named entity device 130 is misconfigured or that this is a stolen named entity device 130 placed in the field by a malicious actor. If the error message indicates that the signature failed, the administrative device 114 may determine that the named entity device 130 is misconfigured or that a spoofing attempt has occurred. If the error message indicates a bad location, the administrative device 114 may determine that the named entity device 130 is misconfigured or that the broadcasted message is a repeated message. The administrative device 114 may accommodate for repeated messages that result from drifts in the GPS measurements of the policy consuming device 136 (e.g. using a distance threshold).

Computing Machine Architecture

FIG. 5 is a block diagram illustrating components of an example computing machine that is capable of reading instructions from a computer-readable medium and executes them in a processor (or controller). A computer described herein may include a single computing machine shown in FIG. 5, a virtual machine, a distributed computing system that includes multiple nodes of computing machines shown in FIG. 5, or any other suitable arrangement of computing devices.

By way of example, FIG. 5 shows a diagrammatic representation of a computing machine in the example form of a computer system 500 within which instructions 524 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 5 may correspond to any software, hardware, or combined components shown in various figures, such as various servers and devices shown in FIG. 1, various engines and modules shown in FIG. 2. While FIG. 5 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 that specify actions to be taken by that machine. Further, while only a single machine is illustrated, the term "machine" and "computer"

may also be taken to include any collection of machines that individually or jointly execute instructions 524 to perform any one or more of the methodologies discussed herein.

The example computer system 500 includes one or more processors 502 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 500 may also include a memory 504 that stores computer code including instructions 524 that may cause the processors 502 to perform certain actions when the instructions are executed, directly or indirectly by the processors 502. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 502 and reduces the space required for the memory 504. For example, the machine learning methods described herein reduces the complexity of the computation of the processors 502 by applying one or more novel techniques that simplify the steps in training, reaching convergence, and generating results of the processors 502. The algorithms described herein also reduces the size of the models and datasets to reduce the storage space requirement for memory 504.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 500 may include a main memory 504, and a static memory 506, which are configured to communicate with each other via a bus 508. The computer system 500 may further include a graphics display unit 510 (e.g., a plasma display panel (PDP), a liquid crystal display (LCD), a projector, or a cathode ray tube (CRT)). The graphics display unit 510, controlled by the processors 502, displays a graphical user interface (GUI) to display one or more results and data generated by the processes described herein. The computer system 500 may also include an alphanumeric input device 512 (e.g., a keyboard), a cursor control device 514 (e.g., a mouse, a trackball, a joystick, a motion sensor, or another pointing instrument), a storage unit 516 (a hard drive, a solid state drive, a hybrid drive, a memory disk, etc.), a signal generation device 518 (e.g., a speaker), and a network interface device 520, which also are configured to communicate via the bus 508.

The storage unit 516 includes a computer-readable medium 522 on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting computer-readable media. The instructions 524 may be transmitted or received over a network 526 via the network interface device 520.

While computer-readable medium 522 is shown in an example embodiment to be a single medium, the term "computer-readable medium" should be taken to include a single medium or multiple media (e.g., a centralized or distributed database, or associated caches and servers) able to store instructions (e.g., instructions 524). The computer-readable medium may include any medium that is capable of storing instructions (e.g., instructions 524) for execution by the processors (e.g., processors 502) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

Using a third-party server 140 to generate identity records for broadcast message authentication has various benefits over non-central authentication that does not use identity records. By generating identity records at a central, third-party server, the process of revoking or otherwise managing the trust of devices within a network is performed without undue processing or time consumption by organizations to which the devices belong. By using an identity record to validate a broadcast message, the process of authenticating broadcast messages may accurately determine the legitimacy of messages regardless of when or where the message was generated. This may be particularly beneficial for messages that are intentionally broadcast over long distances (e.g., longer than a threshold distance used to gauge the legitimacy of the message). Furthermore, by using public key authentication, the authentication service described herein enables a third-party server and/or an organization to determine that a named entity device has been misconfigured or that a spoofing attempt has occurred-a determination that is not possible by merely using a time or a location at which it was generated. Further yet, by using a third-party server 140 that publishes identity records to a namespace server, the shared wireless bandwidth used by nearby beacons and policy consuming devices may be conserved by using an out-of-band communication channel (e.g., a cellular protocol) to access the namespace server and reserve in-band communication channels (e.g., Wi-Fi) for receiving messages broadcasted by named entity devices.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
providing, by a third-party server, an interface for an organization to manage a plurality of named entity devices controlled by the organization, each of the plurality of named entity devices associated with a location, the interface allowing the organization to activate or deactivate any of the plurality of named entity devices at the location;
receiving, by the third-party server, an identity publication request for a named entity device public key for a named entity device, the identity publication request including the named entity device public key, the named entity device public key corresponding to a named entity device private key held by the named entity device;
receiving, via the interface, an activation request for the named entity device from the organization;
generating, by the third-party server, a domain name system (DNS) record for the named entity device using a third-party server private key, the DNS record comprising the named entity device public key, a location record and a status record;
storing the DNS record that comprises the named entity device public key in a namespace server;
receiving an authentication request from a policy consuming device for authenticating the named entity device, the authentication request sent responsive to the named entity device sending a signed message to the policy consuming device, the signed message comprising a timestamp, the location where the named entity device is located, and a signature generated by the named entity device using the named entity device private key;
determining that the named entity device is selected as activated by the organization; and
causing a transmission of the DNS record from the namespace server to the policy consuming device to provide the policy consuming device to use the named entity device public key to validate the signed message broadcasted to the policy consuming device by the named entity device, the DNS record including the location record for the policy consuming device to verify the location in the signed message and the status record indicating that the named entity device is activated.

2. The computer-implemented method of claim 1, wherein the policy consuming device drops the signed message responsive to a time difference between a received timestamp and the generated timestamp exceeds a threshold time difference.

3. The computer-implemented method of claim 1, wherein the policy consuming device drops the signed message responsive to a distance difference between a location of policy consuming device and the location of the named entity device exceeds a threshold distance difference.

4. The computer-implemented method of claim 1, wherein the signed message further comprises a status indicating whether the named entity device is authorized to broadcast messages or has been compromised and wherein the policy consuming device drops the signed message responsive to the status indicating that the named entity device has been compromised.

5. The computer-implemented method of claim 1, wherein the identity publication request is an authentication certificate request, wherein the DNS record is an authentication certificate, and wherein the namespace server provides, responsive to receiving the authentication request from the policy consuming device, the authentication certificate including the named entity device public key to the policy consuming device.

6. The computer-implemented method of claim 5, wherein the authentication certificate has a X.509 digital certificate format and the namespace server operates according to a DNS-based Authentication of Named Entities (DANE) protocol.

7. The computer-implemented method of claim 1, wherein the namespace server provides the named entity device public key to the policy consuming device using domain name system security extensions (DNSSEC).

8. The computer-implemented method of claim 1, further comprising initiating a publication workflow to publish a signed certificate at the namespace server.

9. The computer-implemented method of claim 1, wherein the named entity device is a roadside beacon.

10. The computer-implemented method of claim 1, wherein an automated vehicle includes the policy consuming device and wherein the automated vehicle modifies an automated routine using the validated signed message.

11. A system, comprising:
one or more processors; and
memory configured to store instructions, the instructions, when executed by the one or more processors, cause the one or more processors to:
provide, by a third-party server, an interface for an organization to manage a plurality of named entity devices controlled by the organization, each of the plurality of named entity devices associated with a location, the interface allowing the organization to activate or deactivate any of the plurality of named entity devices at the location;
receive, by the third-party server, an identity publication request for a named entity device public key for a named entity device, the identity publication request including the named entity device public key, the named entity device public key corresponding to a named entity device private key held by the named entity device;
receive, via the interface, an activation request for the named entity device from the organization;
generate, by the third-party server, a domain name system (DNS) record for the named entity device using a third-party server private key, the DNS record comprising the named entity device public key, a location record and a status record;
store the DNS record that comprises the named entity device public key, the location and the timestamp in a namespace server;
receive an authentication request from a policy consuming device for authenticating the named entity device, the authentication request sent responsive to the named entity device sending a signed message to the policy consuming device, the signed message comprising a timestamp, the location where the named entity device is located, and a signature generated by the named entity device using the named entity device private key;
determine that the named entity device is selected as activated by the organization; and
cause a transmission of the DNS record from the namespace server to the policy consuming device to provide the policy consuming device to use the named entity device public key to validate the signed message broadcasted to the policy consuming device by the named entity device, the DNS record including the location record for the policy consuming device to verify the location in the signed message and the status record indicating that the named entity device is activated.

12. The system of claim 11, wherein the policy consuming device drops the signed message responsive to a time difference between a received timestamp and the generated timestamp exceeds a threshold time difference.

13. The system of claim 11, wherein the policy consuming device drops the signed message responsive to a distance difference between a location of policy consuming device and the location of the named entity device exceeds a threshold distance difference.

14. The system of claim 11, wherein the namespace server provides the named entity device public key to the policy consuming device using domain name system security extensions (DNSSEC).

15. The system of claim 11, wherein the signed message further comprises a status indicating whether the named entity device is authorized to broadcast messages or has been compromised and wherein the policy consuming device drops the signed message responsive to the status indicating that the named entity device has been compromised.

16. A non-transitory computer-readable storage medium configured to store computer code comprising instructions, the instructions, when executed by one or more processors, cause the one or more processors to:
provide, by a third-party server, an interface for an organization to manage a plurality of named entity devices controlled by the organization, each of the plurality of named entity devices associated with a location, the interface allowing the organization to activate or deactivate any of the plurality of named entity devices at the location;
receive, by the third-party server, an identity publication request for a named entity device public key for a named entity device, the identity publication request including the named entity device public key, the named entity device public key corresponding to a named entity device private key held by the named entity device;
receive, via the interface, an activation request for the named entity device from the organization;
generate, by the third-party server, a domain name system (DNS) record for the named entity device using a third-party server private key, the DNS record comprising the named entity device public key, a location record and a status record;
store the DNS record that comprises the named entity device public key, the location and the timestamp in a namespace server;
receive an authentication request from a policy consuming device for authenticating the named entity device, the authentication request sent responsive to the named entity device sending a signed message to the policy consuming device, the signed message comprising a timestamp, the location where the named entity device is located, and a signature generated by the named entity device using the named entity device private key;
determine that the named entity device is selected as activated by the organization; and
cause a transmission of the DNS record from the namespace server to the policy consuming device to provide the policy consuming device to use the named entity device public key to validate the signed message broadcasted to the policy consuming device by the named entity device, the DNS record including the location record for the policy consuming device to verify the location in the signed message and the status record indicating that the named entity device is activated.

17. The non-transitory computer-readable storage medium of claim 16, wherein the policy consuming device drops the signed message responsive to a time difference between a received timestamp and the generated timestamp exceeds a threshold time difference.

18. The non-transitory computer-readable storage medium of claim 16, wherein the policy consuming device drops the signed message responsive to a distance difference between a location of policy consuming device and the location of the named entity device exceeds a threshold distance difference.

19. The non-transitory computer-readable storage medium of claim 16, wherein the namespace server provides the named entity device public key to the policy consuming device using domain name system security extensions (DNSSEC).

20. The non-transitory computer-readable storage medium of claim 16, wherein the signed message further comprises a status indicating whether the named entity device is authorized to broadcast messages or has been compromised and wherein the policy consuming device drops the signed message responsive to the status indicating that the named entity device has been compromised.

* * * * *